(12) United States Patent
Poole

(10) Patent No.: US 9,176,249 B2
(45) Date of Patent: *Nov. 3, 2015

(54) DEVICE AND METHOD FOR PROCESSING VARIABLE DEPTH STREAMER DATA

(71) Applicant: CGGVERITAS SERVICES SA, Massy Cedex (FR)

(72) Inventor: Gordon Poole, East Grinstead (GB)

(73) Assignee: CGGVERITAS SERVICES SA, Massy Cedex (FR)

( * ) Notice: Subject to any disclaimer, the term of this patent is extended or adjusted under 35 U.S.C. 154(b) by 466 days.

This patent is subject to a terminal disclaimer.

(21) Appl. No.: 13/751,917

(22) Filed: Jan. 28, 2013

(65) Prior Publication Data

US 2013/0163379 A1 Jun. 27, 2013

Related U.S. Application Data

(63) Continuation-in-part of application No. 13/334,776, filed on Dec. 22, 2011.

(60) Provisional application No. 61/578,777, filed on Dec. 21, 2011.

(51) Int. Cl.
*G01V 1/38* (2006.01)
*G01V 1/36* (2006.01)

(52) U.S. Cl.
CPC .. *G01V 1/38* (2013.01); *G01V 1/36* (2013.01); *G01V 2210/56* (2013.01)

(58) Field of Classification Search
CPC ............ G01V 1/36; G01V 1/364; G01V 1/38
See application file for complete search history.

(56) References Cited

U.S. PATENT DOCUMENTS

| 4,353,121 A | 10/1982 | Ray et al. |
| 4,992,992 A | 2/1991 | Dragoset, Jr. |
| 7,817,495 B2 | 10/2010 | Ozbek et al. |
| 2010/0211320 A1 | 8/2010 | Vassallo et al. |
| 2011/0134721 A1 | 6/2011 | Deffenbaugh et al. |
| 2011/0292762 A1 | 12/2011 | Ozdemir et al. |

(Continued)

FOREIGN PATENT DOCUMENTS

| EP | 2395374 A1 | 12/2011 |
| GB | 2477031 A | 7/2011 |

(Continued)

OTHER PUBLICATIONS

Office Action mailed Dec. 10, 2014 in related U.S. Appl. No. 13/334,776.

(Continued)

*Primary Examiner* — Isam Alsomiri
*Assistant Examiner* — Hovhannes Baghdasaryan
(74) *Attorney, Agent, or Firm* — Patent Portfolio Builders PLLC

(57) ABSTRACT

Computing device, computer instructions and method for deghosting seismic data related to a subsurface of a body of water. The method includes receiving seismic data recorded by seismic receivers that are towed by a vessel, wherein the seismic data is recorded in a time-space domain; modeling the seismic data in a shot or common midpoint domain as a function of operators to derive a model; using the derived model to remove the receiver ghost from the seismic data to obtain deghosted seismic data; and generating a final image of the subsurface based on the deghosted seismic data.

29 Claims, 13 Drawing Sheets

(56) References Cited

U.S. PATENT DOCUMENTS

2011/0305109 A1 12/2011 Soubaras
2012/0092956 A1 4/2012 Soubaras

FOREIGN PATENT DOCUMENTS

| | | |
|---|---|---|
| GB | 2493088 A | 1/2013 |
| WO | 2011/154463 A1 | 12/2011 |
| WO | 2014/072387 A2 | 5/2014 |

OTHER PUBLICATIONS

Lasse Amundsen et al., "Multidimensional Signature Deconvolution and Free-Surface Multiple Elimination of Marine Multicomponent Ocean-Bottom Seismic Data", Geophysics, Sep.-Oct. 2001, pp. 1594-1604, vol. 66, No. 5.

Guochun Lu et al., "Model-Based Removal of Water-Layer Multiple Reflections", Geophysics, Nov.-Dec. 1999, pp. 1816-1827, vol. 64, No. 6.

Ronan Sablon et al., "Multiple Attenuation for Variable-Depth Streamer Data: From Deep to Shallow Water", SEG San Antonio 2011 Annual Meeting, Jan. 1, 2011, pp. 3505-3509.

Extended EP Search Report dated May 13, 2013 in corresponding Application EP 12199166.5.

International Search Report mailed May 13, 2013 in corresponding PCT/EP2012/076778.

Written Opinion mailed May 13, 2013 in corresponding PCT/EP2012/076778.

Search Report mailed Apr. 19, 2013 in corresponding GB1223080.1.

DEVICE AND METHOD FOR PROCESSING VARIABLE DEPTH STREAMER DATA

CROSS-REFERENCE TO RELATED APPLICATIONS

The present application is a continuation-in-part of U.S. patent application Ser. No. 13/334,776 filed on Dec. 22, 2011, having the title "Device and Method for Deghosting Variable Depth Streamer Data," and being authored by G. Poole, and which claims the benefit of priority of U.S. Provisional Application 61/578,777, having the title "Device and Method for Deghosting Variable Depth Streamer Data," and being authored by G. Poole, the entire contents of which are incorporated herein by reference.

BACKGROUND

1. Technical Field

Embodiments of the subject matter disclosed herein generally relate to methods and systems and, more particularly, to mechanisms and techniques for processing seismic data (e.g., deghosting, reghosting, redatuming, or combinations thereof) collected with one or more streamers having variable or identical depths.

2. Discussion of the Background

During the past years, interest in developing new oil and gas production fields has dramatically increased. However, the availability of land-based production fields is limited. Thus, the industry has now extended drilling to offshore locations, which appear to hold a vast amount of fossil fuel. Offshore drilling is an expensive process. Thus, those engaged in such a costly undertaking invest substantially in geophysical surveys in order to more accurately decide where to drill or not (to avoid a dry well).

Marine seismic data acquisition and processing generate a profile (image) of the geophysical structure (subsurface) under the seafloor. While this profile does not provide an accurate location for oil and gas, it suggests, to those trained in the field, the presence or absence of oil and/or gas. Thus, providing a high-resolution image of the subsurface is an ongoing process for the exploration of natural resources, including, among others, oil and/or gas.

During a seismic gathering process, as shown in FIG. 1, a vessel 10 tows plural detectors 12. The plural detectors 12 are disposed along a cable 14. Cable 14 together with its corresponding detectors 12 are sometimes referred to, by those skilled in the art, as a streamer 16. The vessel 10 may tow plural streamers 16 at the same time. The streamers may be disposed horizontally, i.e., lying at a constant depth $z_1$ relative to the surface 18 of the ocean. Also, the plural streamers 16 may form a constant angle (i.e., the streamers may be slanted) with respect to the surface of the ocean as disclosed in U.S. Pat. No. 4,992,992, the entire content of which is incorporated herein by reference. FIG. 2 shows such a configuration in which all the detectors 12 are distributed along a slanted straight line 14 that makes a constant angle α with a reference horizontal line 30.

With reference to FIG. 1, the vessel 10 also tows a sound source 20 configured to generate an acoustic wave 22a. The acoustic wave 22a propagates downward and penetrates the seafloor 24, eventually being reflected by a reflecting structure 26 (reflector R). The reflected acoustic wave 22b propagates upward and is detected by detector 12. For simplicity, FIG. 1 shows only two paths 22a corresponding to the acoustic wave. However, the acoustic wave emitted by the source 20 may be substantially a spherical wave, e.g., it propagates in all directions starting from the source 20. Parts of the reflected acoustic wave 22b (primary) are recorded by the various detectors 12 (the recorded signals are called traces) while parts of the reflected wave 22c pass the detectors 12 and arrive at the water surface 18. Since the interface between the water and air is well approximated as a quasi-perfect reflector (i.e., the water surface acts as a mirror for the acoustic waves), the reflected wave 22c is reflected back toward the detector 12 as shown by wave 22d in FIG. 1. Wave 22d is normally referred to as a ghost wave because this wave is due to a spurious reflection. The ghosts are also recorded by the detector 12, but with a reverse polarity and a time lag relative to the primary wave 22b. The degenerative effect that the ghost arrival has on seismic bandwidth and resolution is known. In essence, interference between primary and ghost arrivals causes notches, or gaps, in the frequency content recorded by the detectors.

The traces may be used to determine the subsurface (i.e., earth structure below surface 24) and to determine the position and presence of reflectors 26. However, the ghosts disturb the accuracy of the final image of the subsurface and, for at least this reason, various methods exist for removing the ghosts, i.e., deghosting, from the results of a seismic analysis.

U.S. Pat. Nos. 4,353,121 and 4,992,992, the entire contents of which are incorporated herein by reference, describe processing procedures that allow ghosts to be removed from recorded seismic data by using an acquisition device that includes a seismic streamer slanted at an angle (on the order of 2 degrees) to the surface of the water (slanted streamer).

Using slanted streamers, it is possible to achieve ghost suppression during the data summation operation (during pre-stack operations). In fact, the acquired data is redundant, and the processing procedure includes a summation step or "stacking" for obtaining the final image of the subsurface structure from the redundant data. Ghost suppression is performed in the art during the stacking step because the recordings that contribute to the stack, having been recorded by different receivers, have notches at different frequencies, such that the information that is missing due to the presence of a notch on one seismic receiver is obtained from another receiver.

Further, U.S. Pat. No. 4,353,121 describes a seismic data processing procedure based on the following known steps: (1) common depth point collection, (2) one-dimensional (1D) extrapolation onto a horizontal surface, or "datuming," (3) Nomal MoveOut (NMO) correction, and (4) summation or stack.

Datuming is a processing procedure in which data from N seismic detectors $D_n$ (with positions $(x_n, z_n)$, where n=1, ... N and N is a natural number, $x_i = x_j$ but $z_i$ is different from $z_j$ with i and j taking values between 1 and N), is used to synthesize data corresponding to seismic detectors that have the same horizontal positions $x_n$ and the same constant reference depth $z_0$ for all the seismic detectors.

Datuming is called 1D if it is assumed that the seismic waves propagate vertically. In that case, the procedure includes applying to each time-domain recording acquired by a given seismic detector a delay or a static shift corresponding to the vertical propagation time between the true depth $z_n$ of a detector $D_n$ and the reference depth $z_0$.

Similar to U.S. Pat. No. 4,353,121, U.S. Pat. No. 4,992,992 proposes to reconstitute from seismic data recorded with a slanted cable seismic data as would have been recorded by a horizontal cable. However, U.S. Pat. No. 4,992,992 takes into account the non-vertical propagation of the seismic waves by replacing the 1D datuming step of U.S. Pat. No. 4,353,121 with a 2D datuming step. The 2D datuming step takes into account the fact that the propagation of the waves is not necessarily vertical, unlike what is assumed to be the case in the 1D datuming step proposed by U.S. Pat. No. 4,353,121.

The methods described in U.S. Pat. Nos. 4,353,121 and 4,992,992 are seismic processing procedures in one dimension and in two dimensions. Such procedures, however, cannot be generalized to three dimensions. This is so because a sampling interval of the sensors in the third dimension is given by the separation between the streamers, on the order of 150 m, which is much larger than the sampling interval of the sensors along the streamers, which is on the order of 12.5 m. Also, existing procedures may apply a deghosting step at the beginning of the processing, which is not always very efficient.

Thus, the above-discussed methods are not appropriate for seismic data collected with streamers having a curved profile as illustrated in FIG. 3. Such configuration has a streamer 52 with a curved profile defined by three parametric quantities, $z_0$, $s_0$ and $h_c$. It is noted that not the entire streamer has to have the curved profile. The first parameter $z_0$ indicates the depth of the first detector 54a relative to the surface 58 of the water. The second parameter $s_0$ is related to the slope of the initial part of the streamer 52 relative to a horizontal line 64. The example shown in FIG. 3 has the initial slope $s_0$ equal to substantially 3 percent. It is noted that the profile of the streamer 52 in FIG. 3 is not drawn to scale because a slope of 3 percent is a relatively small quantity. The third parameter $h_c$ indicates a horizontal length (distance along the X axis in FIG. 3 measured from the first detector 54a) of the curved portion of the streamer. This parameter may be in the range of hundreds to thousands of meters.

For such streamers, a deghosting process has been disclosed in U.S. patent application Ser. No. 13/272,428 (herein '428) authored by R Soubaras, the entire content of which is incorporated herein. According to '428, a method for deghosting uses joint deconvolution for migration and mirror migration images for generating a final image of a subsurface. The deghosting is performed at the end of the processing (during an imaging phase) and not at the beginning as with traditional methods. Further, '428 discloses that no datuming step is performed on the data.

However, the existing methods need a velocity field in order to achieve the deghosting. Thus, if there is a case in which the velocity field is not available, there is a need for a method that is capable, particularly for pre-processing steps such as velocity picking or demultiple, to deghost the data without knowledge of the velocity field. Accordingly, it would be desirable to provide systems and methods that have such capabilities.

SUMMARY

According to an exemplary embodiment, there is a method for processing receiver seismic data related to a subsurface of a body of water. The method includes a step of receiving seismic data recorded by seismic receivers that are towed by a vessel, wherein the seismic data is recorded in a time-space domain and the seismic receivers are located in the body of water; a step of modeling the seismic data in a shot or common midpoint domain as a function of operators to derive a model; a step of using the derived model to remove a receiver ghost to obtain deghosted seismic data; and a step of generating a final image of the subsurface based on the deghosted seismic data.

According to another exemplary embodiment, there is a method for processing receiver seismic data related to a subsurface of a body of water. The method includes a step of receiving seismic data recorded by seismic receivers that are towed by a vessel, wherein the seismic data is recorded in a time-space domain and the seismic data has already been processed to remove a receiver ghost; a step of modeling the processed seismic data in a shot or common midpoint domain as a function of operators to derive a model; a step of using the derived model to generate a ghost dataset; a step of using the ghost data to re-ghost the processed seismic data to obtain reghosted seismic data; and a step of generating a final image of the subsurface based on the reghosted seismic data.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

Figure 1:
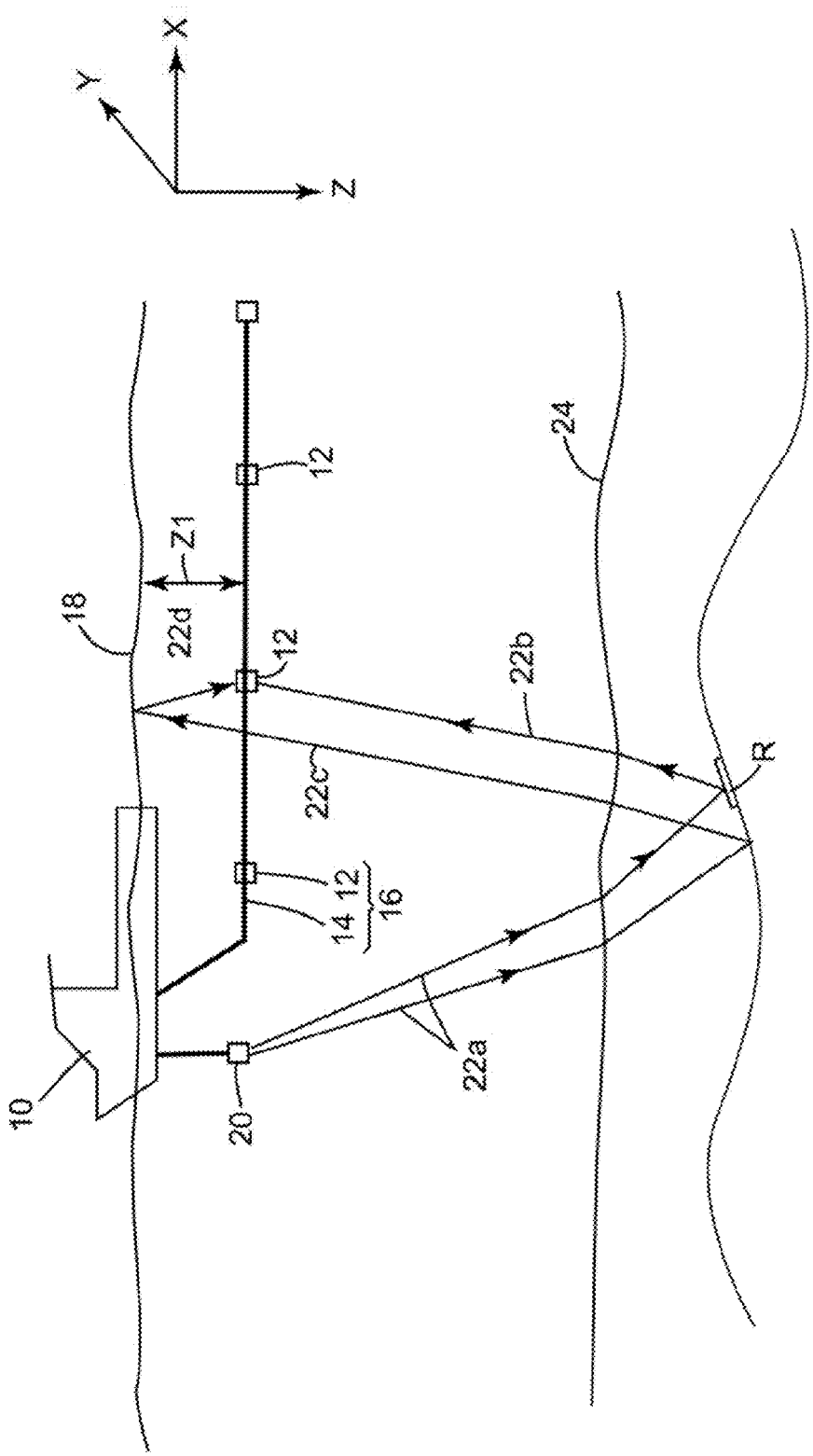
FIG. 1 is a schematic diagram of a conventional seismic data acquisition system having a horizontal streamer.
Figure 2:
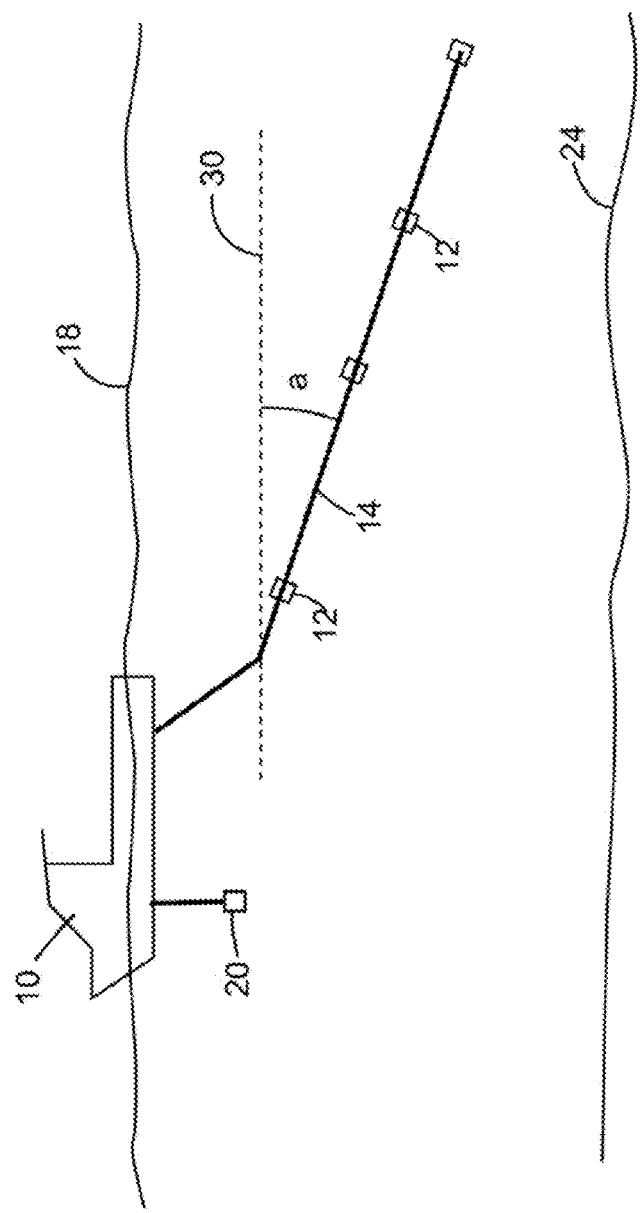
FIG. 2 is a schematic diagram of a conventional seismic data acquisition system having a slanted streamer.
Figure 3:
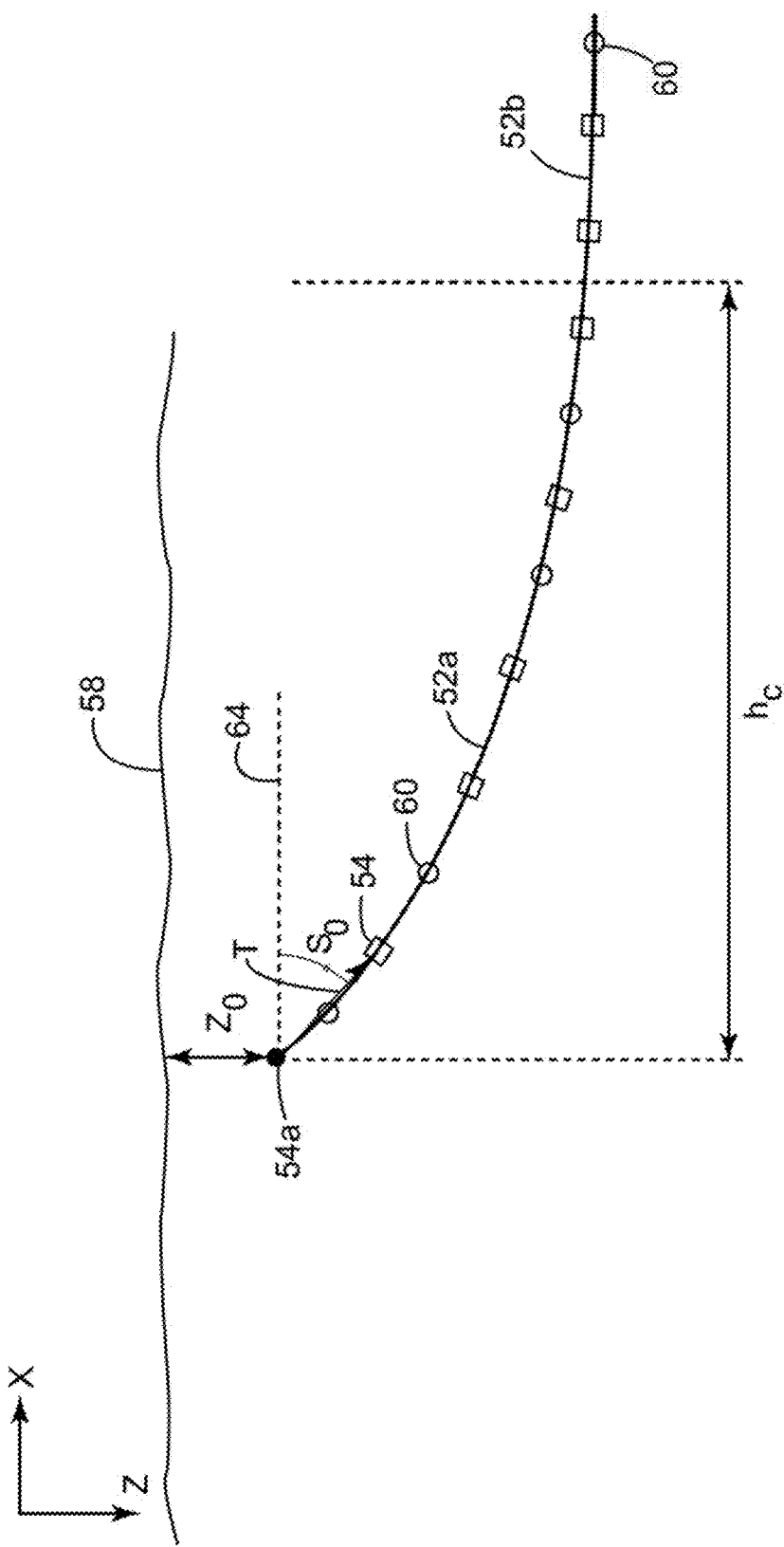
FIG. 3 is a schematic diagram of a seismic data acquisition system having a curved profile streamer.

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a two-dimensional (2D) wave-field propagation and a deghosting procedure. However, the embodiments to be discussed next are not limited to 2D wave-fields, but may be also applied to 3D wave-fields. Also, the embodiments are also applicable to reghosting, redatuming and combinations of these algorithms.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an exemplary embodiment, a modified representation of a linear least squares Radon algorithm is used to simultaneously model primary and ghost receiver wave-fields as well as re-datum the wave-fields from the streamer (receiver) to the sea surface or other desired surface. The method assumes that the primary and ghost components are well described by plane waves and uses a tau-p transform to transform seismic data collected with a variable depth (e.g., curved profile) streamer. The recorded seismic data includes amplitudes of plural wavelets and associated times for a given frequency spectrum. The tau-p transform is a special case of a Radon transform where input data is decomposed as a series of straight lines in the time-space domain and the straight lines are mapped to points in the tau-p domain. For example, hyperbolic events (e.g., those in shot gathers) in the time-space domain map to elliptical curves in the tau-p domain. This process is referred to as slant-stacking because, to produce the tau-p domain, the input data may be stacked along a series of straight lines.

For each frequency slice (when the recorded seismic data has been transformed into the frequency domain), a standard tau-p transform solves a phase shift equation d=Lp(1). More specifically, considering that d represents the input data for a 2D shot-point gather of n traces for one frequency slide, p is the tau-p domain containing m slowness traces, and L is the reverse slant stack, equation (1) can be rewritten in matrix form as:

$$\begin{pmatrix} d_1 \\ d_2 \\ \vdots \\ d_n \end{pmatrix} = \begin{pmatrix} e^{-2\pi i f \tau_{n,m}} \end{pmatrix} \begin{pmatrix} p_1 \\ p_2 \\ p_3 \\ \vdots \\ p_m \end{pmatrix}. \quad (2)$$

A time-shift $\tau$ of each matrix element depends on the offset of each trace in meters ($x_n$) and the slowness of the p-trace in seconds/meter ($s_m$) and for this reason only one generic (n,m) matrix element is shown in the matrix L above. The offset of a trace is given by a distance between a seismic source that shoots seismic waves and a receiver that records the trace, while the slowness is defined as the sine of an incidence angle divided by the speed of the wave fields in water. Thus, the time-shift may be written as $\tau_{n,m} = x_n s_m$.

According to an exemplary embodiment, the above equations are modified to achieve a ghost-free tau-p transform at sea surface datum based on the plane wave propagation properties of the primary and ghost components. In one application, another horizontal datum may be used. In still another application, a slanted or curved datum may be used. In this regard, FIG. 4 shows the ray propagation of primary and ghost components for a particular slowness and how this ghost-free surface datum data is reverse-transformed, the output traces being generated from separate primary and ghost components.

Figure 4:
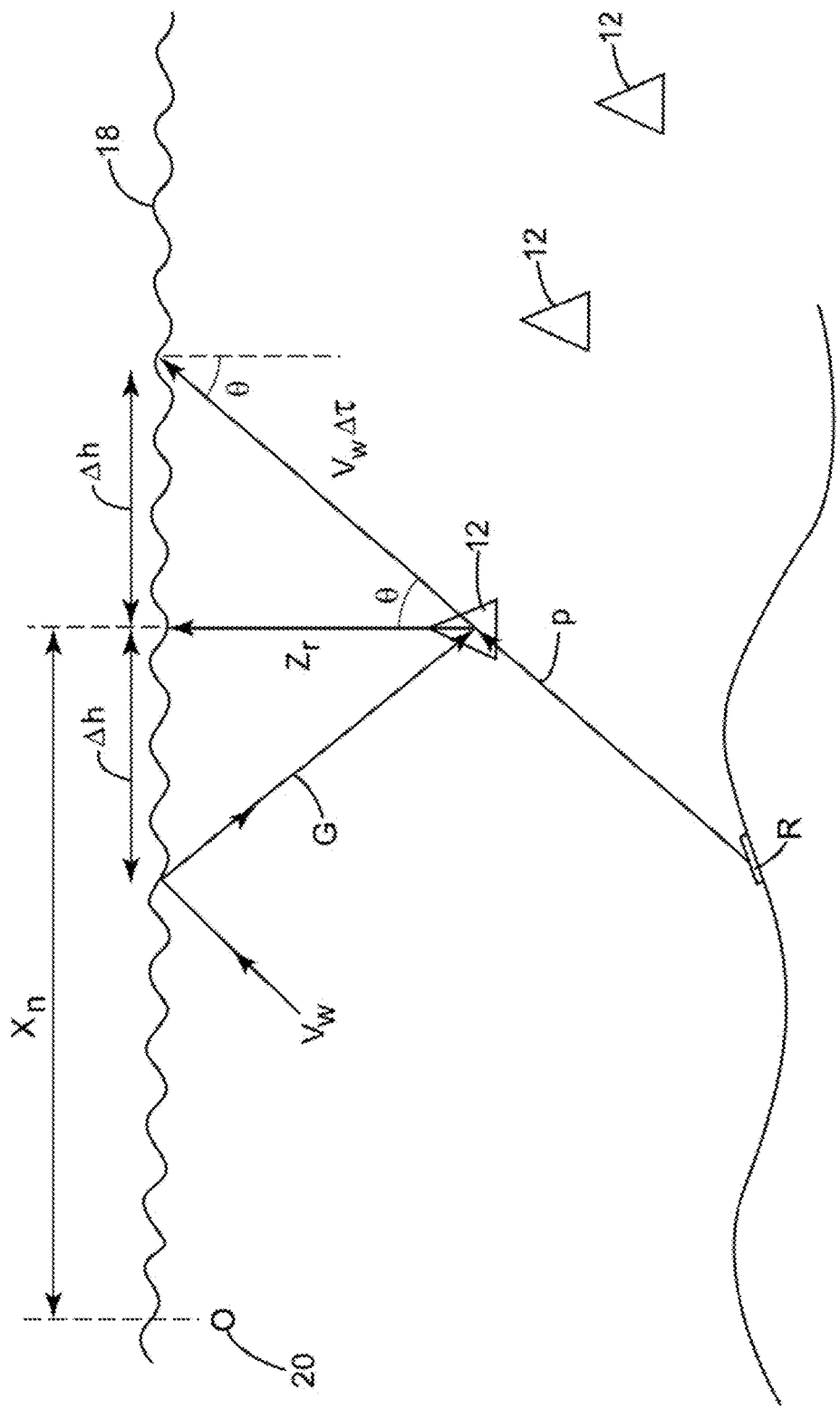
FIG. 4 is a schematic diagram of a seismic receiver and associated primary and ghost components according to an exemplary embodiment.

FIG. 4 shows a receiver 12 having a depth $z_r$ (and other receivers 12 having different depths) relative to the sea surface 18 and an offset $x_n$ relative to a source 20. The primary component P is shown arriving at the receiver 12 from the subsurface being investigated, while the ghost component G arrives at the receiver 12 from the sea surface 18. If these two components are re-datum to the sea surface 18, then the primary component arrives at a surface datum with an offset longer (with $\Delta h$ in FIG. 4, i.e., $x_n + \Delta h$) than that of the receiver, and the ghost component arrives at the same surface datum with a shorter offset (also $\Delta h$ in FIG. 4, i.e., $x_n - \Delta h$). In addition, the primary component is time advanced by $v_w \Delta \tau$ relative to the surface datum, while the ghost component experiences a time delay of $v_w \Delta \tau$, where $v_w$ is the velocity of sound in water. As discussed above, another datum may be used, in which case, the values of the depths are modified accordingly.

Using trigonometry and the two triangles shown in FIG. 4, the incidence angle $\theta$ (relative to vertical) is given by $\sin \theta = s_m v_w$. The offset (for both the primary and the ghost) is given by $\Delta h = z_r \tan \theta$ where $z_r$ is the receiver depth, which may be different for each receiver of a streamer. Finally, the delay time $\Delta \tau$ is given by:

$$\Delta \tau = \frac{\sqrt{z_r^2 + \Delta h^2}}{v_w}. \quad (3)$$

Based on the above equations, the reverse slant stack L is modified to contain primary and ghost components $L_{n,m} = e^{-2\pi i f \tau_{gh}}$, where R is the reflection coefficient at the sea surface (usually −1) and $\tau_{pr}$ and $\tau_{gh}$ are the time delays of the primary and ghost components, respectively. The time delay for the primary component is given by:

$$\tau_{pr} = (x_n + \Delta h) s_m - \Delta \tau \quad (4)$$

while the time delay for the ghost is given by:

$$\tau_{gh} = (x_n - \Delta h) s_m + \Delta \tau \quad (5).$$

At certain frequencies, the above equations may become unstable when the primary and ghost components are approximately equal. For this reason, in one exemplary embodiment, the diagonal of $L^H L$ (where $L^H$ is the hermittian (conjugate and transpose) of L) is damped or the component of L can be replaced with only the primary component. Alternatively, a limit in amplitude boosting may be imposed whilst still applying full phase deghosting.

While the notation here describes the process in the temporal frequency domain (working independently on frequency slices), the method may also be applied in the time domain. The method may be applied on the whole shot or mid-point gather or on overlapping spatial and/or temporal windows. In addition, it may be useful to include sparseness weights as with many high resolution algorithms.

Having measured d, the tau-p transform p may be calculated using the novel transform L. In one application, equation (2) may be solved using least squares inversion, e.g., Choletsky factorization, LU decomposition, conjugate gradients, etc. The resulting tau-p transform p can then be reverse-transformed to the frequency domain to generate the shot gather. In one exemplary embodiment, the tau-p transform p is reverse-transformed with $L_{n,m} = e^{-2\pi i f \tau_{pr}}$ to remove the ghost and leave data at original datum. In another exemplary embodiment, the tau-p transform p is reverse-transformed with $L_{n,m} = e^{-2\pi i f x_n s_m}$ to remove the ghost and output the data at zero datum (i.e., deghosting and redatuming). In still another exemplary embodiment, the tau-p transform p is reverse-transformed to re-datum with or without re-ghost to a user-defined datum.

The process may be thought of as two steps. In the first step, a model is derived from input data using a transfer matrix representing the primary terms, $L_{primary}$, ghost terms, $L_{ghost}$, or primary and ghost terms, $L_{primary+ghost}$ (first step). Note that the input data may include only primary, only ghost, or both of them. The model is then used in the second step to generate the output data which may also be primary, ghost, or primary and ghost, redatumed or not. The operators associated with the model may be at the same datum as the input data (data on which the operators are applied) or at a new datum ($L_{primary}'$, $L_{ghost}'$, and $L_{primary+ghost}'$ respectively). In one application, the input data is d, the model is p and the transfer matrix is L, when using the notations associated with equation (1). These steps are summarized as follows:

For deghosting—if the datum is left unchanged and the input data contains primary and ghost energy, determine a model (first step), using for example, $L_{primary+ghost}$ to derive a primary model space (input data for the second step) and then apply $L_{primary}$ to the model to obtain as output data the primary;

To deghost and if the datum is to be changed when the input data contains primary and ghost energy, determine (first step), for example, $L_{primary+ghost}$ to obtain a primary model (input data for the second step) and then apply $L_{primary}'$ to the model to redatum and output only primary data;

For reghosting, where the input contains only primary data—if the datum is left unchanged, determine (first step), for example, $L_{primary}$ to obtain the primary model (input data for the second step) and then apply $L_{primary+ghost}$ to the model to obtain as output data for the primary and ghost;

For reghosting, if the datum is to be changed and the input contains only primary energy, determine (first step), for example, $L_{primary}$ to obtain a model of the primary data (input data for the second step) and then apply $L_{primary+ghost}'$ to the model to redatum and reghost;

For redatuming, it is possible to modify the ghost timing based on the new datum, e.g., determine (first step) $L_{primary}$ to obtain a model containing only primary energy (input data for the second step) and then apply $L_{primary+ghost}'$ to redatum and re-ghost; and Still for the redatuming, where the input contains primary and ghost energy, it is also possible to deghost at the same time, e.g., determine (first step) $L_{primary+ghost}$ to obtain a model containing primary and ghost energy (input data for the second step) and then apply $L_{primary}'$ to generate the output (deghosted data) at a designed datum.

Note that for the first step one or more operators are used while for the second step the same or different operators may be used, i.e., operators that are redatumed.

The user defined datum may be representative of a horizontal streamer or a different cable shape. This can be of particular use for time lapse processing projects. In this case, the time delays $\tau_{pr}$ and $\tau_{gh}$ are recalculated based on the user-defined datum.

Often a processing flow contains a demultiple sequence, i.e., a set of processing techniques for removing multiple from the data. With variable depth data it is generally beneficial to remove the receiver ghost so conventional demultiple techniques may be used. After a multiple model has been generated, it may be re-ghosted and subtracted from the original input data. To perform this operation, the methodology is modified so the model is derived so as to model primary only. This primary model may be used to generate ghost data which may be used to re-ghost the data.

In one application, subtracting the primary estimate from the input data can be used to find an estimate of the ghost. A similar method can be used to re-ghost the data generated by this process. An alternative formulation using a modified version of the wave-number transform may also be used.

While the above-discussed embodiments assume a 2D propagation of the wave-fields, the equations can be extended to 3D where the slowness in the offset-x and offset-y directions are used. The 3D implementation works on all streamers from a full 3D shot (or 'super-shot' in the case of wide-azimuth data) so that it has access to offsets in the x- and y-directions.

Where the offset-y sampling is deemed too coarse for a full 3D implementation, an extension of the 2D algorithm which makes use of a slowness estimate in the offset-y direction can be utilized. Such an estimate could come from the RMS velocity field (the derivatives of the moveout curve in the offset-y direction would be used as slowness in this case), or from dip measurements in the crossline direction.

A further extension beyond linear Radon could be to use parabolic or hyperbolic Radon domains. In the hyperbolic Radon case, a single point in the tau-p domain would map to separate upgoing and downgoing events in the shot domain based on receivers with varying datum.

The above-discussed embodiments have one thing in common: they all model the input data through linear equations which are designed to apply re-datuming as well as re-ghosting as a reverse transform from model to data space. Once the equations have been solved, it is assumed the transform domain makes a representation of ghost-free input data.

Figure 5:
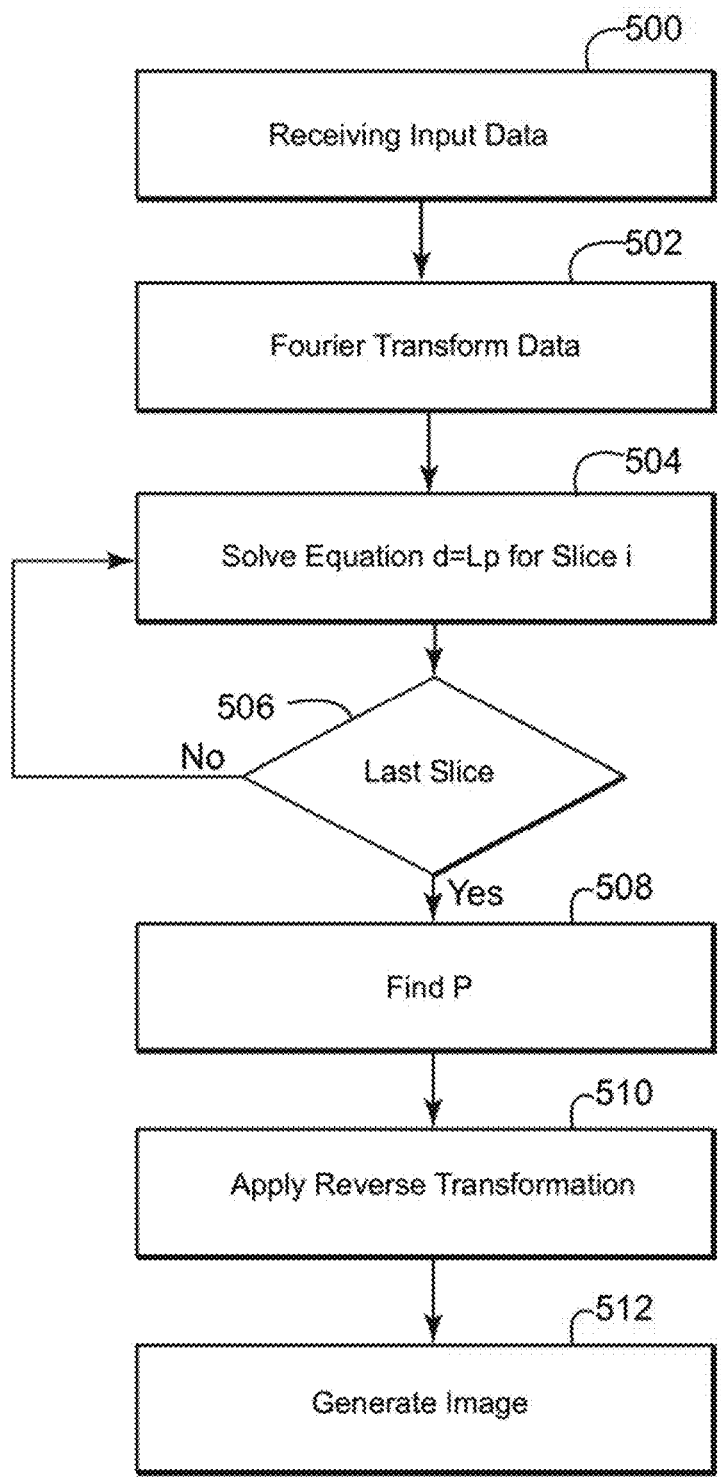
FIG. 5 is a flowchart of a method for deghosting seismic data according to an exemplary embodiment.

One or more of the exemplary embodiments discussed above may be implemented in a method for processing seismic data. According to an exemplary embodiment illustrated in FIG. 5, there is a method that works on pre-stack to deghost and/or re-datum seismic data recorded with a streamer having varying receiver depths. The method includes a step 500 of receiving input data for one shot point gather for a range of 2D offsets. The data includes wavelet amplitudes recorded at given times (t) and offsets (x). This data in the time-space domain is transformed in step 502 by a Fourier transform (FFT) into the frequency-space domain. In this step, each trace of the input data may be FFT transformed. Then, the data in the frequency-space domain is divided into frequency slices.

In step 504, the equation d=Lp is solved for each slice using the conjugate gradients algorithm, which is known in the art as discussed above. Thus, step 504 requires the application of L followed by the application of $L^H$ for determining p. The method iterates through each slice until the last slice is considered. When the last slice is solved, it is detected in step 506 that the method can advance to step 508. In step 508, the tau-p transform p is obtained by assembling its components iteratively calculated in steps 504 and 506.

In step 510 the tau-p transform p is reverse-transformed to one of the configurations discussed above, i.e., remove ghost and leave data at original datum, or remove ghost and output data at zero datum, or re-datum with or without re-ghost. Alternatively, the primary estimate may be removed from the input data to find an estimate of the ghost.

Irrespective of the transformation used in step 510, the primary and/or ghost data is used in step 512, in a processor or other dedicated computing device, to generate an image of the surveyed subsurface. It is noted that the above method may be implemented in a dedicated computing device (to be discussed later) and may not be mentally used to generate images of the subsurface.

Figure 6:
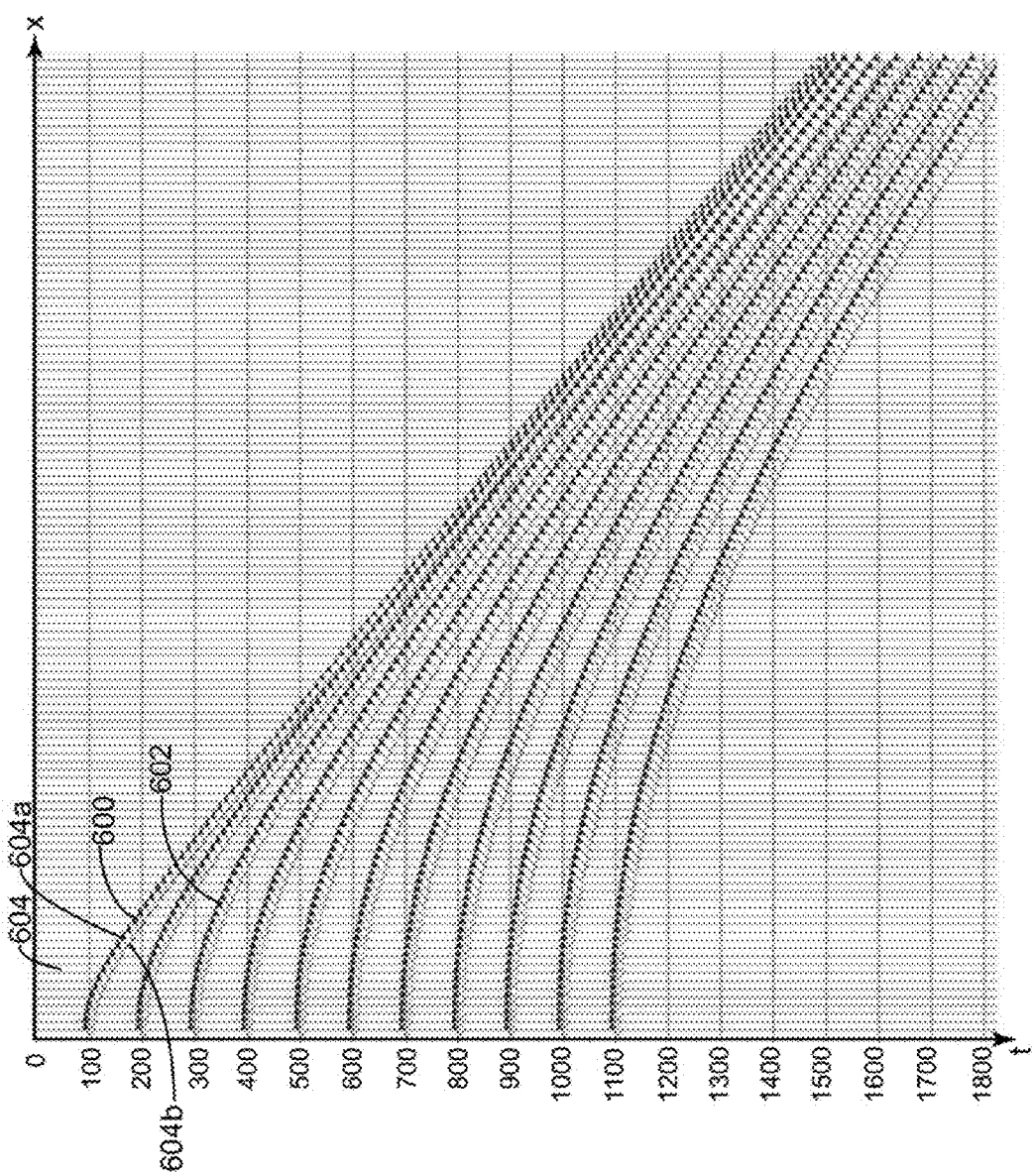
FIG. 6 is a graph illustrating synthetic raw data recorded by seismic receivers.
Figure 7:
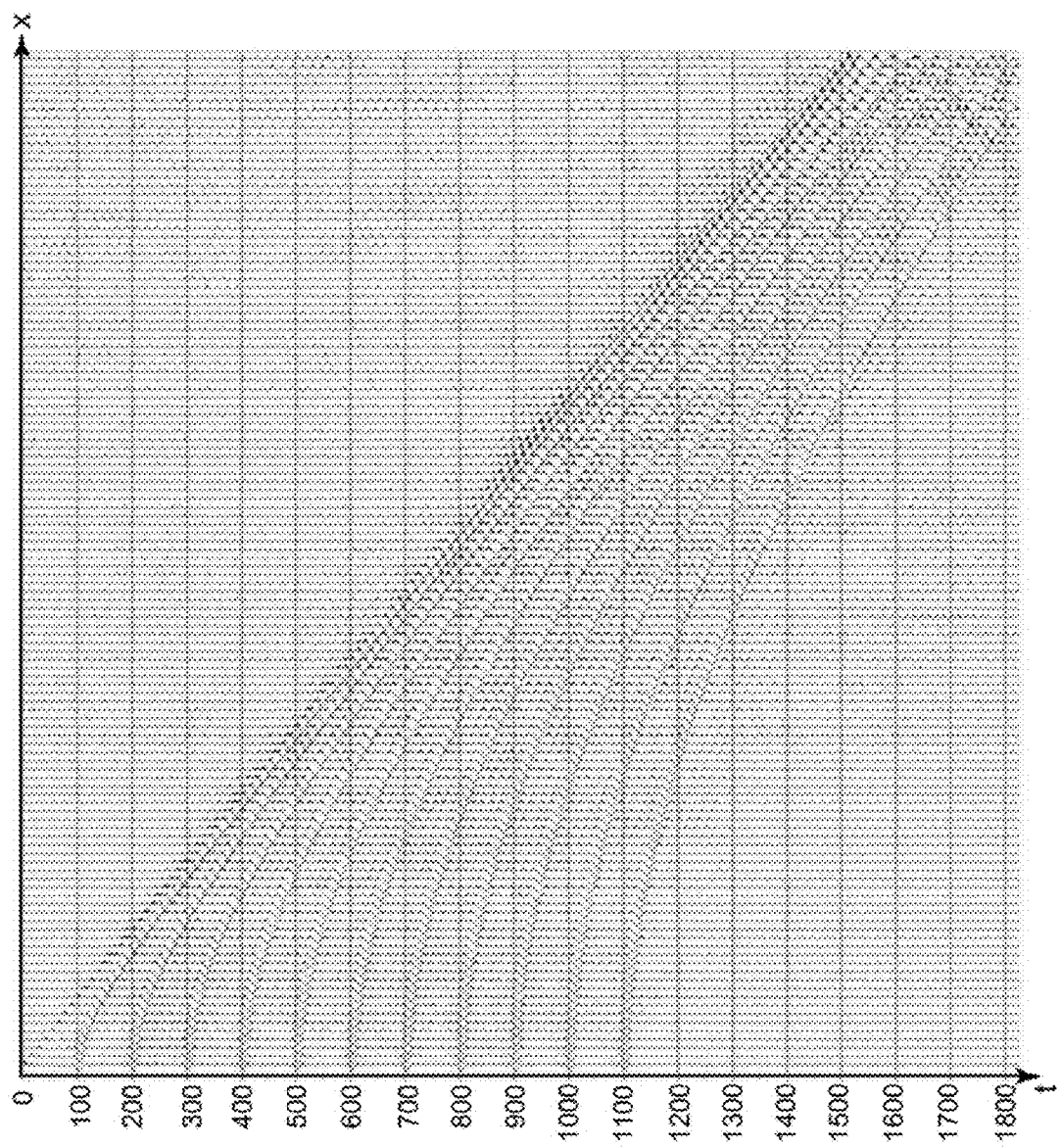
FIG. 7 is a graph illustrating synthetic ghost data determined by a method according to an exemplary embodiment.
Figure 8:
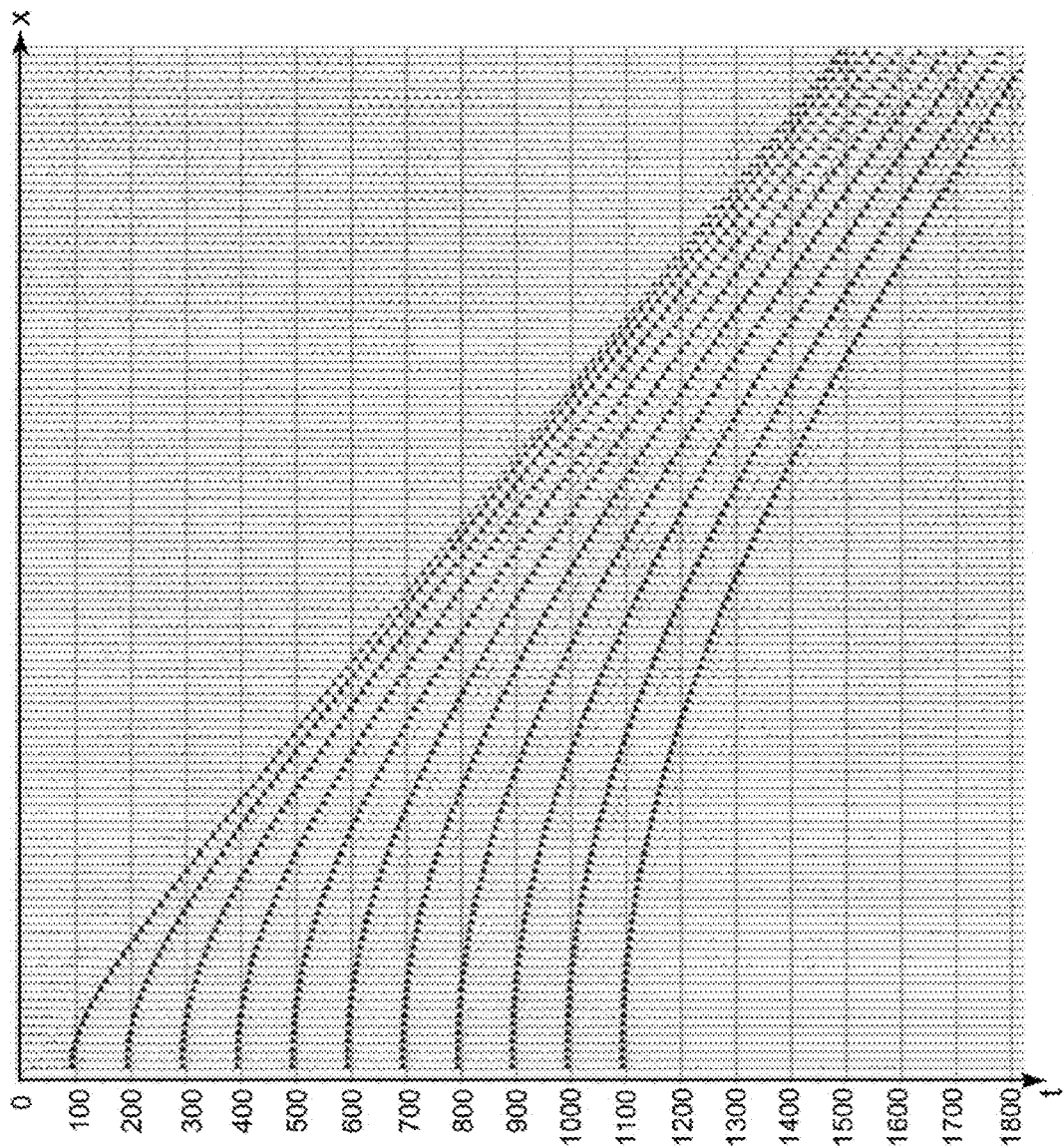
FIG. 8 is a graph illustrating deghosted data determined by a method according to an exemplary embodiment.

To exemplify the advantages of the present method, FIG. 6 shows synthetic raw data generated by computer and simulating the input data recorded by the receivers and provided in step 500 above. FIG. 6 shows plural wavelets recorded at offsets x and times t. For example, curves 600 and 602 may correspond to water-bottom reflection and a reflection from the feature R as shown in FIG. 4. Each of these curves includes parts of plural traces. A trace 604 is the data recorded by a single seismic receiver, e.g., a hydrophone or a geophone. The trace 604 includes both the primary component 604a (black wavelet) and the ghost component 604b (white wavelet). Applying the process illustrated in FIG. 5, the ghost component may be separated as shown in FIG. 7, and the deghosted data is obtained as shown in FIG. 8. The image of the feature R may be determined from the ghost data shown in FIG. 7 or from the deghosted data shown in FIG. 8 or from both of them. It is noted that the model may either estimate the ghost and this estimate is subtracted from the input data (recorded data) or the model outputs the primary estimate rather than making an estimate of the ghost energy and subtracting it from the input. By doing the latter it is possible to output the primary at surface datum, at the original depths on the cable, or any other datum.

As the method discussed above works on pre-stack data, the method can advantageously be used to deghost and/or re-datum seismic data with a varying receiver datum pre-stack without any need for knowledge of a velocity field. This gives the method distinct advantages over other methods, particularly for pre-processing steps such as velocity picking or demultiple.

Figure 9:
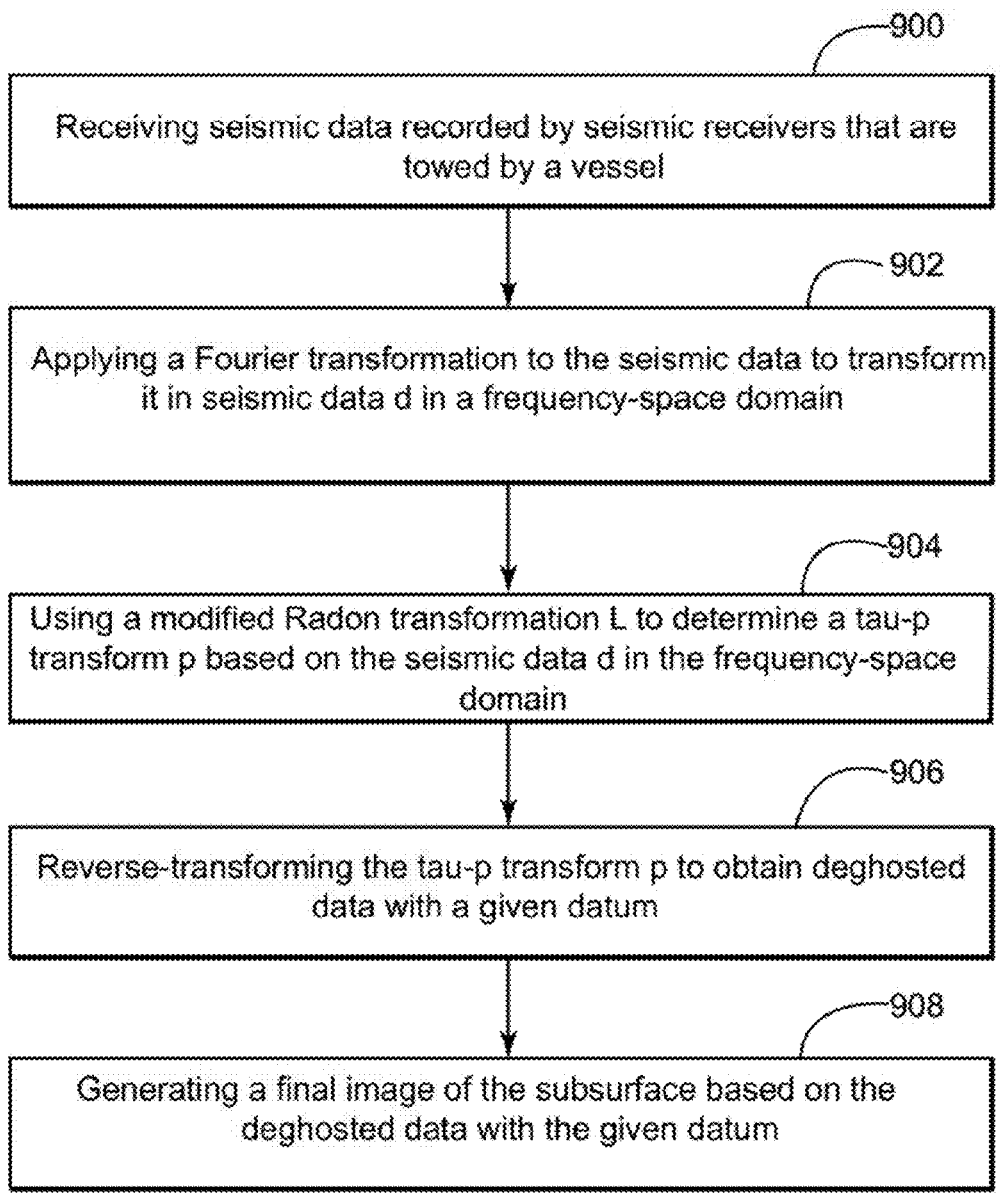
FIG. 9 is a flowchart of a method for deghosting seismic data according to an exemplary embodiment.
Figure 10:
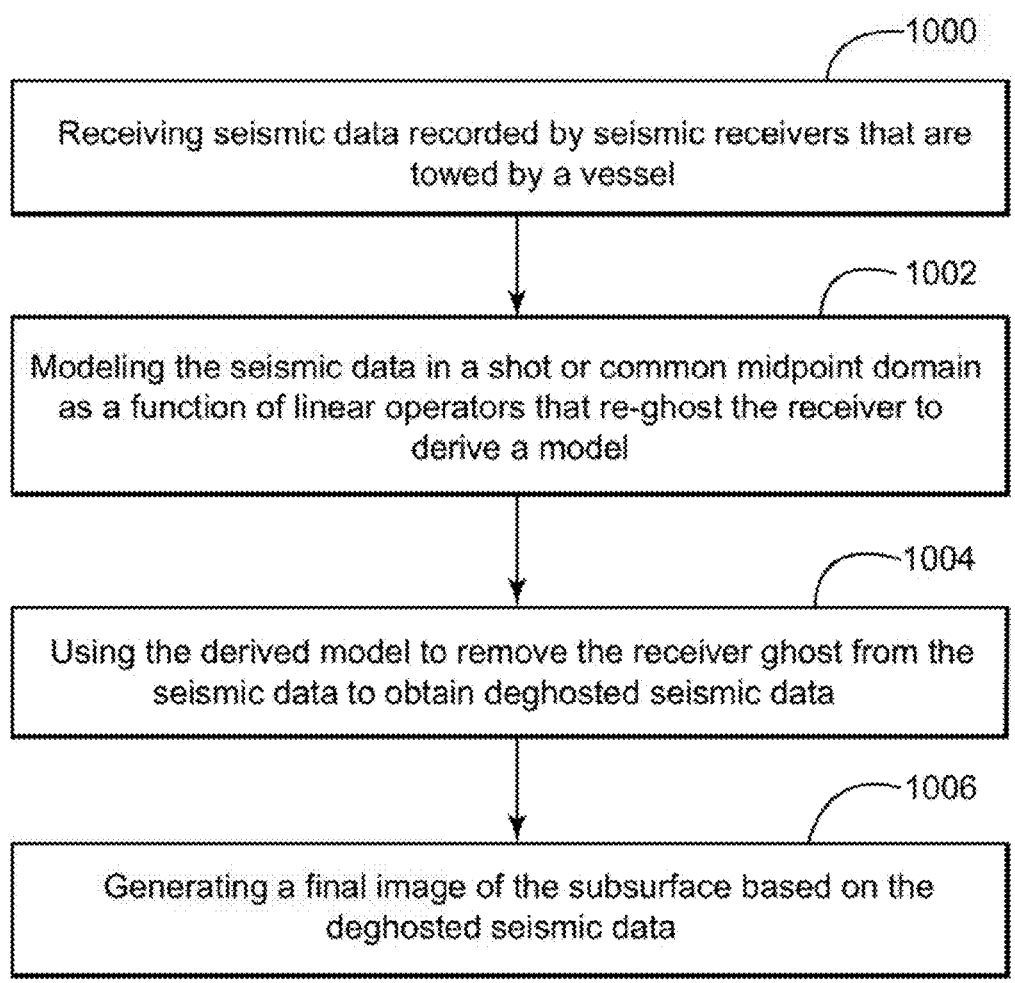
FIG. 10 is a flowchart of another method for deghosting seismic data according to an exemplary embodiment.

According to an exemplary embodiment illustrated in FIG. 9, there is a method for deghosting seismic data related to a subsurface of a body of water. The method includes a step 900 of receiving seismic data recorded by seismic receivers that are towed by a vessel, wherein the seismic data is recorded in a time-space domain and the seismic receivers are located at different depths ($z_r$) in the body of water; a step 902 of applying a Fourier transformation to the seismic data to transform it in seismic data d in a frequency-space domain; a step 904 of using a modified Radon transformation L to determine a tau-p transform p based on the seismic data d in the frequency-space domain; a step 906 of reverse-transforming the tau-p transform p to obtain deghosted data with a given datum; and a step 908 of generating a final image of the subsurface based on the deghosted data with the given datum. The modified Radon transformation L includes a first term for a primary component (P) and a second term for a ghost component (G).

According to another exemplary embodiment, there is a method for receiver deghosting seismic data related to a subsurface of a body of water. The method includes a step 1000 of receiving seismic data recorded by seismic receivers that are towed by a vessel, wherein the seismic data is recorded in a time-space domain and the seismic receivers are located at different depths ($z_r$) in the body of water; a step 1002 of modeling the seismic data in a shot or common midpoint domain as a function of linear operators that re-ghost the receiver to derive a model; a step 1004 of using the derived model to remove the receiver ghost from the seismic data to obtain deghosted seismic data; and a step 1006 of generating a final image of the subsurface based on the deghosted seismic data.

Figure 11:
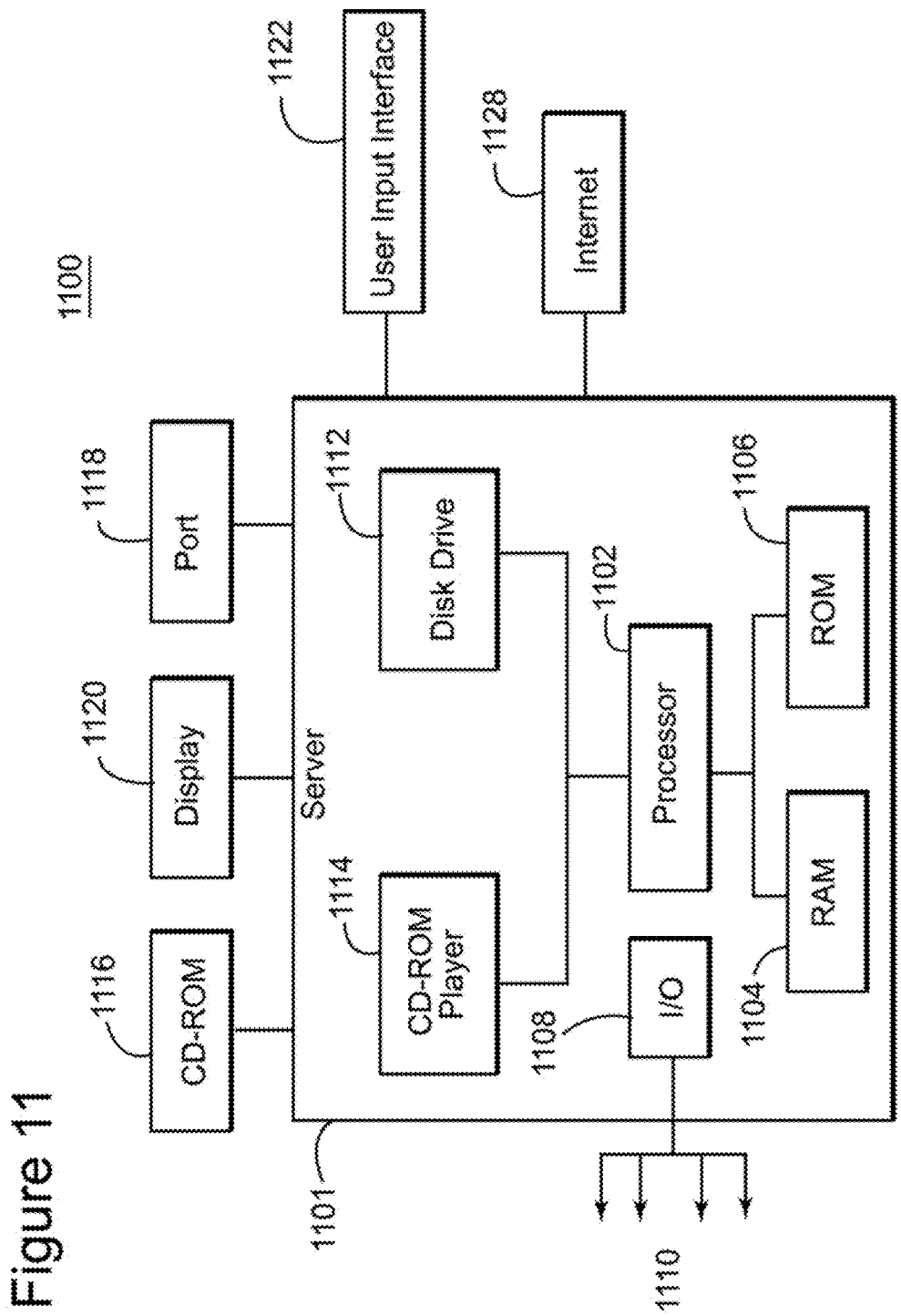
FIG. 11 is a schematic diagram of a computing device configured to implement a deghosting method according to an exemplary embodiment.

The above-discussed procedures and methods may be implemented in a computing device illustrated in FIG. 11. Hardware, firmware, software or a combination thereof may be used to perform the various steps and operations described herein. The computing device 1100 of FIG. 11 is an exemplary computing structure that may be used in connection with such a system.

The exemplary computing device 1100 suitable for performing the activities described in the exemplary embodiments may include a server 1101. Such a server 1101 may include a central processor (CPU) 1102 coupled to a random access memory (RAM) 1104 and to a read-only memory (ROM) 1106. The ROM 1106 may also be other types of storage media to store programs, such as programmable ROM (PROM), erasable PROM (EPROM), etc. The processor 1102 may communicate with other internal and external components through input/output (I/O) circuitry 1108 and bussing 1110, to provide control signals and the like. The processor 1102 carries out a variety of functions as are known in the art, as dictated by software and/or firmware instructions.

The server 1101 may also include one or more data storage devices, including hard drives 1112, CD-ROM drives 1114, and other hardware capable of reading and/or storing information such as DVD, etc. In one embodiment, software for carrying out the above-discussed steps may be stored and distributed on a CD-ROM or DVD 1116, a USB storage device 1118 or other form of media capable of portably storing information. These storage media may be inserted into, and read by, devices such as the CD-ROM drive 1114, the disk drive 1112, etc. The server 1101 may be coupled to a display 1120, which may be any type of known display or presentation screen, such as LCD displays, plasma display, cathode ray tubes (CRT), etc. A user input interface 1122 is provided, including one or more user interface mechanisms such as a mouse, keyboard, microphone, touchpad, touch screen, voice-recognition system, etc.

The server 1101 may be coupled to other devices, such as sources, detectors, etc. The server may be part of a larger network configuration as in a global area network (GAN) such as the Internet 1128, which allows ultimate connection to the various landline and/or mobile computing devices.

Two methods for deghosting and reghosting seismic data are briefly discussed now. It is noted that these methods correspond to two possibilities of processing the data and other variations may be imagined by those skilled in the art. Also, it is noted that when modeling the seismic data a first set of operators may be used while when using the model to determine output seismic data, for the final image, a second set of operators may be used. In one application, each set of operators includes a single operator. The type of operator is dictated by the input data and by the type of output data that is desired.

Figure 12:
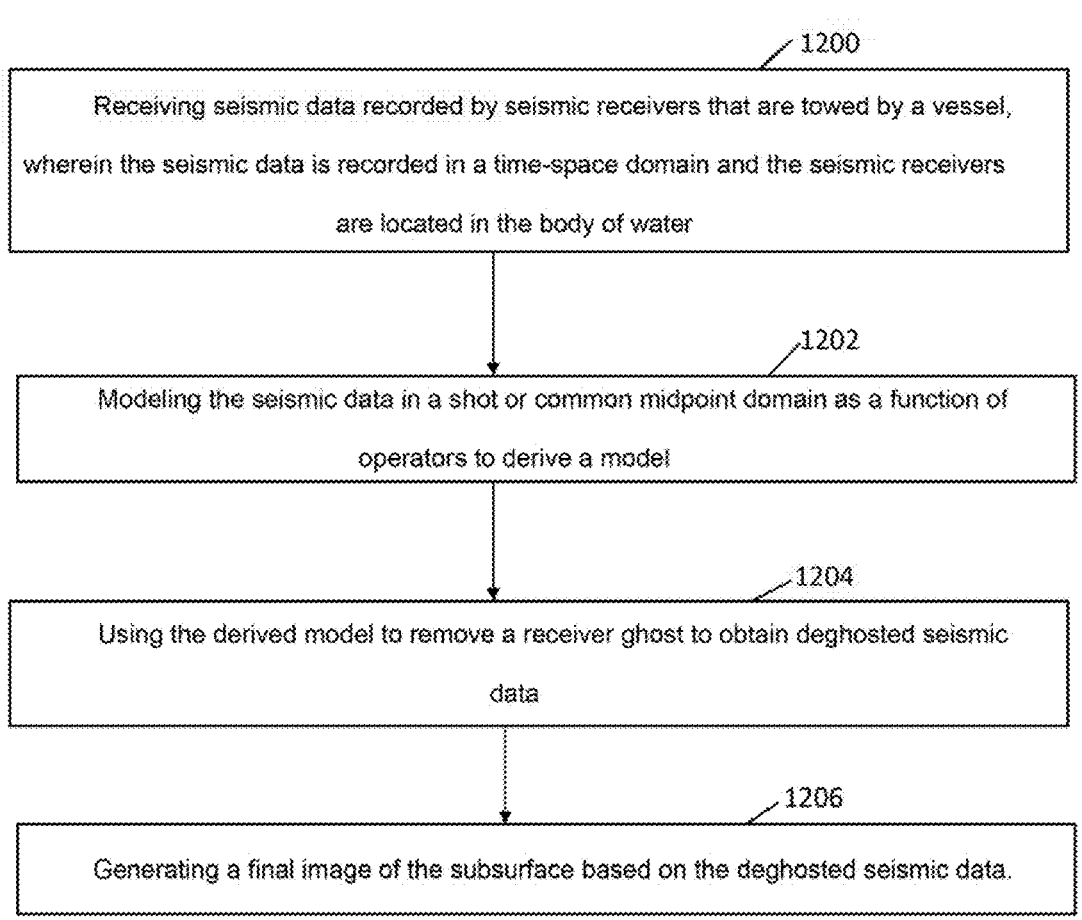
FIG. 12 is a flowchart of a method for deghosting seismic data according to an exemplary embodiment.

According to another exemplary embodiment illustrated in FIG. 12, there is a method for processing receiver seismic data related to a subsurface of a body of water. The method includes a step 1200 of receiving seismic data recorded by seismic receivers that are towed by a vessel, wherein the seismic data is recorded in a time-space domain and the seismic receivers are located in the body of water; a step 1202 of modeling the seismic data in a shot or common midpoint domain as a function of operators to derive a model; a step 1204 of using the derived model to remove a receiver ghost to obtain deghosted seismic data; and a step 1206 of generating a final image of the subsurface based on the deghosted seismic data.

Figure 13:
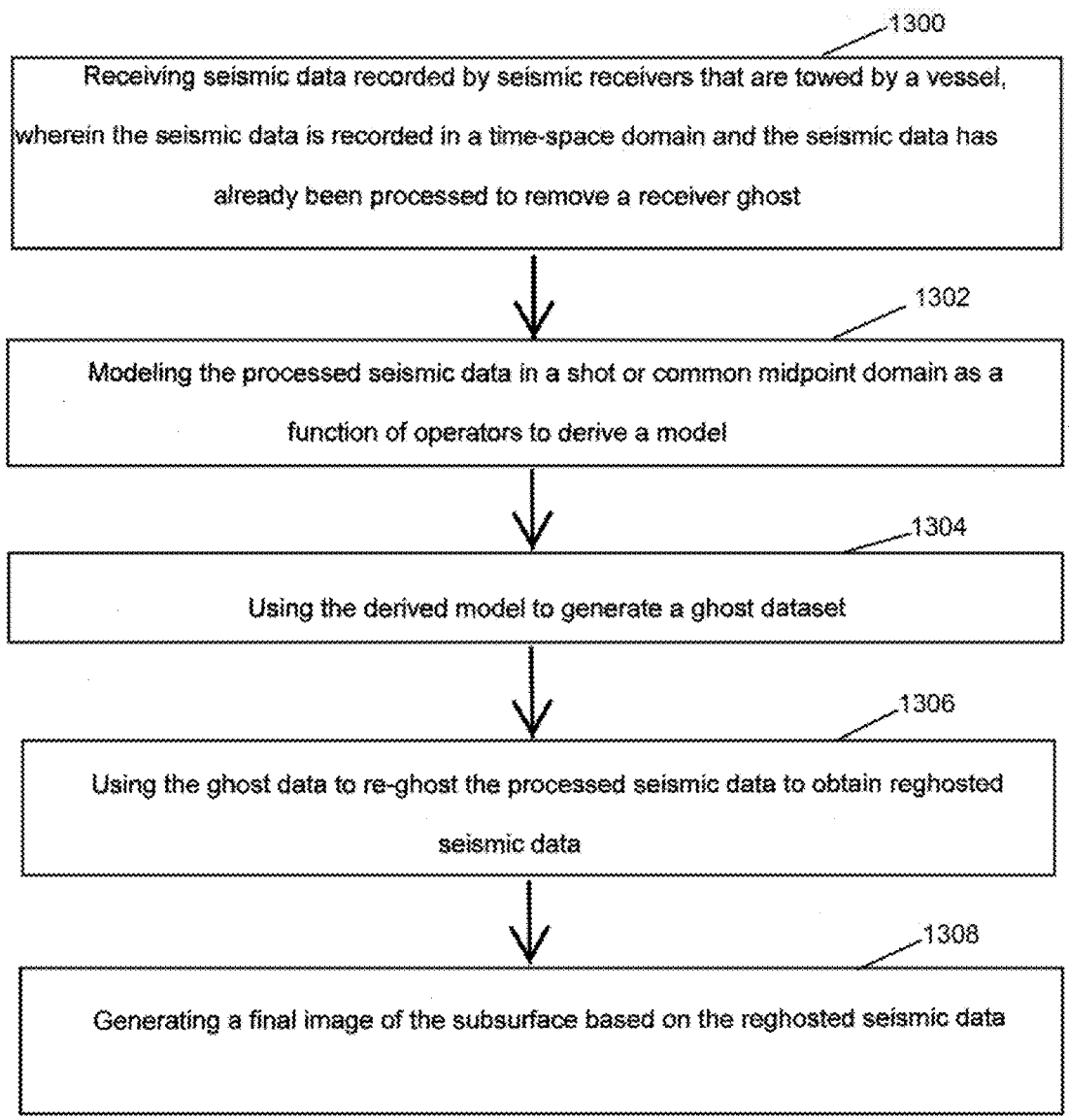
FIG. 13 is a flowchart of a method for reghosting seismic data according to an exemplary embodiment.

According to another exemplary embodiment illustrated in FIG. 13, there is a method for processing receiver seismic data related to a subsurface of a body of water. The method includes a step 1300 of receiving seismic data recorded by seismic receivers that are towed by a vessel, wherein the seismic data is recorded in a time-space domain and the seismic data has already been processed to remove a receiver ghost; a step 1302 of modeling the processed seismic data in a shot or common midpoint domain as a function of operators to derive a model; a step 1304 of using the derived model to generate a ghost dataset; a step 1306 of using the ghost data to re-ghost the processed seismic data to obtain reghosted seismic data; and a step 1308 of generating a final image of the subsurface based on the reghosted seismic data.

The disclosed exemplary embodiments provide a computing device and a method for seismic data processing. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for separating primaries from ghosts of seismic data related to a subsurface of a body of water, the method comprising:
    receiving seismic data recorded by seismic receivers, wherein the seismic data is recorded in a time-space domain and the seismic receivers are located in the body of water;
    deriving a model domain describing the seismic data, the model domain being determined based on a function of a first operator representative of receiver ghost energy and a second operator representative of primary energy, wherein the first operator introduces sea-surface ghost energy by multiplying the first operator with a reflection coefficient at the sea-surface, and, in addition, the first and second operators reverse transform the model domain to obtain a representation of the seismic data, and the model domain is a domain other than the time-space domain;
    using the derived model domain to separate primary from ghost energy by applying a third operator to the derived model domain; and
    generating a final image of the subsurface based on the separated primary or ghost energy.

2. The method of claim 1, wherein the operators relate to a modified reverse tau-p transformation that includes a first term that takes into account a first delay time ($\tau_{pr}$) for a primary component (P), and a second term that takes into account a second delay time ($\tau_{gh}$) for a ghost component (G).

3. The method of claim 2, wherein the first delay time ($\tau_{pr}$) is related to a time necessary for the primary component (P) to travel from a seismic receiver to the sea surface and the second delay time $\tau_{gh}$ is related to a time necessary for the ghost component (G) to travel from the sea surface to the seismic receiver.

4. The method of claim 1, wherein the seismic data is recorded by the seismic receivers provided on a variable depth streamer.

5. The method of claim 1, wherein the seismic data is recorded by the seismic receivers provided on a horizontal depth streamer or a slanted streamer.

6. The method of claim 1, further comprising:
    applying least squares inversion to solve an equation d=Lp for p, where L represents the first and second operators, p is the model domain, which is a receiver ghost free model of the seismic data, and d is the recorded data itself.

7. The method of claim 1, wherein the derived model domain is two-dimensional or three-dimensional and it is used to separate a primary component and a ghost component.

8. The method of claim 1, further comprising:
    simultaneously modeling primary and ghost components with a linear operator L.

9. The method of claim 1, further comprising:
    applying an operator $L_{n,m}=e^{-2\pi i f \tau_{pr}}$ as the second operator to remove a ghost component and maintain the seismic data at a given datum, where f is a frequency, $\tau_{pr}$ is a delay time for a primary component (P), n is a trace number in the seismic data, and m is a model domain trace number.

10. The method of claim 1, further comprising:
    applying an operator $L_{n,m}=e^{-2\pi i f x_n s_m}$ to remove a ghost component and change a given datum to a zero datum, where f is a frequency, ($x_n$) is an offset of each trace of the seismic data in meters, ($s_m$) is a slowness of a trace in the model domain in seconds/meter n is a trace number in the seismic data and m is a trace number in the model domain.

11. The method of claim 1, further comprising:
    using the model domain to output data with or without ghost to another datum.

12. The method of claim 1, wherein the model domain is made on the whole shot or CMP (common midpoint) gather.

13. The method of claim 1, wherein the model domain is made on a sub-set of the shot or CMP (common midpoint) gather.

14. The method of claim 1, wherein the first and second operators are in the frequency domain or in the time domain.

15. The method of claim 1, wherein weights are used to make a high resolution transform.

16. A method for processing receiver seismic data related to a subsurface of a body of water, the method comprising:
    receiving seismic data recorded by seismic receivers, wherein the seismic data is recorded in a time-space domain and the seismic data has already been processed to remove a receiver ghost;
    deriving a model domain describing the processed seismic data in a shot or common midpoint domain as a function of operators that include a first operator representative of primaries;
    applying a second operator to the derived model domain to generate a ghost dataset;
    using the ghost dataset to re-ghost the processed seismic data to obtain reghosted seismic data, wherein re-ghosting introduces sea-surface ghost energy by multiplying the first operator with a reflection coefficient at the sea-surface; and
    generating a final image of the subsurface based on the reghosted seismic data.

17. The method of claim 16, wherein the operators relate to a modified reverse tau-p transformation that includes a first term that takes into account a delay time ($\tau_{pr}$) for a primary component (P).

18. The method of claim 17, wherein the delay time ($\tau_{pr}$) is related to a time necessary for the primary component (P) to travel from a seismic receiver to the sea surface.

19. The method of claim 16, wherein the seismic data is recorded by the seismic receivers provided on a variable depth streamer.

20. The method of claim 16, wherein the seismic data is recorded by the seismic receivers provided on a horizontal depth streamer or a slanted streamer.

21. The method of claim 16, further comprising:
applying least squares inversion to solve an equation d=Lp for p, where L is a linear operator, p is a model of the seismic data, and d is the recorded data itself.

22. The method of claim 16, wherein the derived model domain is two- or three-dimension and it is used to estimate a ghost component to add to the received seismic data.

23. The method of claim 16, further comprising:
modeling the primary component with a linear operator L.

24. The method of claim 16, further comprising:
applying an operator $L_{n,m}=e^{-2\pi i f x_n s_m}$ to add a ghost component and change a given datum to a zero datum.

25. The method of claim 16, further comprising:
re-datuming the model to another datum.

26. The method of claim 16, wherein the model is made on the whole shot or CMP (common midpoint) gather.

27. The method of claim 16, wherein the model is made on a sub-set of the shot or CMP gather.

28. The method of claim 16, wherein the operator is in the frequency domain or in the time domain.

29. The method of claim 16, wherein weights are used to make a high resolution transform.

\* \* \* \* \*